United States Patent
Groult

(10) Patent No.: US 8,452,506 B2
(45) Date of Patent: May 28, 2013

(54) METHOD FOR MONITORING THE ENVIRONMENT OF AN AUTOMATIC VEHICLE

(75) Inventor: Xavier Groult, Survilliers (FR)

(73) Assignee: Valeo Vision, Bobigny (FR)

( * ) Notice: Subject to any disclaimer, the term of this patent is extended or adjusted under 35 U.S.C. 154(b) by 180 days.

(21) Appl. No.: 12/693,587

(22) Filed: Jan. 26, 2010

(65) Prior Publication Data

US 2010/0191433 A1    Jul. 29, 2010

(30) Foreign Application Priority Data

Jan. 29, 2009    (FR) ...................................... 09 00382

(51) Int. Cl.
*B60T 7/12* (2006.01)
*G01S 15/93* (2006.01)

(52) U.S. Cl.
USPC .............. 701/70; 701/301; 303/193; 367/909

(58) Field of Classification Search
USPC ............. 701/70, 301; 180/167, 169; 303/193; 340/435, 904; 342/71; 367/96, 105, 909
See application file for complete search history.

(56) References Cited

U.S. PATENT DOCUMENTS

| | | | |
|---|---|---|---|
| 5,461,357 A | 10/1995 | Yoshioka et al. | |
| 6,100,796 A * | 8/2000 | Wagner et al. | 340/435 |
| 6,289,282 B1 * | 9/2001 | Hassler et al. | 701/301 |
| 6,434,486 B1 * | 8/2002 | Studt et al. | 701/301 |
| 6,842,684 B1 * | 1/2005 | Kade et al. | 701/70 |
| 6,873,911 B2 | 3/2005 | Nishira et al. | |
| 6,898,528 B2 * | 5/2005 | Zorka et al. | 701/301 |
| 7,035,735 B2 * | 4/2006 | Knoop et al. | 701/301 |
| 7,068,155 B2 * | 6/2006 | Kade et al. | 340/436 |
| 7,145,441 B2 | 12/2006 | Knoop et al. | |
| 7,301,479 B2 * | 11/2007 | Regan | 340/932.2 |
| 7,515,056 B2 | 4/2009 | Knoop et al. | |
| 2003/0187578 A1 | 10/2003 | Nishira et al. | |
| 2005/0012602 A1 | 1/2005 | Knoop et al. | |
| 2006/0267748 A1 | 11/2006 | Knoop et al. | |
| 2007/0273490 A1 * | 11/2007 | Fuchs et al. | 340/435 |

FOREIGN PATENT DOCUMENTS

| | | | |
|---|---|---|---|
| EP | 1332910 A1 | | 8/2003 |
| GB | 2334560 A | * | 8/1999 |
| JP | 2000267729 A | * | 9/2000 |
| JP | 2004351992 A | * | 12/2004 |
| JP | 2005056336 A | * | 3/2005 |
| JP | 2007112297 A | * | 5/2007 |
| JP | 2008049932 A | * | 3/2008 |
| WO | 9832030 A1 | | 7/1998 |
| WO | WO 03064215 A1 | * | 8/2003 |

OTHER PUBLICATIONS

JPO Machine Translation of JP 2008-49932 (A).*

* cited by examiner

*Primary Examiner* — James Trammell
*Assistant Examiner* — David Testardi
(74) *Attorney, Agent, or Firm* — Jacox, Meckstroth & Jenkins

(57) ABSTRACT

A device, program and method for monitoring the environment of a vehicle capable of moving according to a path. The device, program and method comprises the steps of calculating a plurality of critical levels of driving depending on detection sensors, parameters related to the vehicle and an obstacle being in the environment of the vehicle, determining if an obstacle is on the path of the vehicle and depending on the calculated critical levels of driving and determination of an obstacle on the path of the vehicle, making a decision concerning the braking of the vehicle.

20 Claims, 5 Drawing Sheets

METHOD FOR MONITORING THE ENVIRONMENT OF AN AUTOMATIC VEHICLE

CROSS-REFERENCE TO RELATED APPLICATIONS

This application claims priority to French Application No. 0900382 filed Jan. 29, 2009, which application is incorporated herein by reference and made a part hereof.

BACKGROUND OF THE INVENTION

1. Field of the Invention

The present invention relates to a method for monitoring the environment of a vehicle capable of moving according to a path and a detection device enabling the method to be implemented.

It finds application particularly in the field of automotive vehicles.

2. Description of the Related Art

In the automotive vehicle industry, a known prior art method for monitoring the environment of a vehicle capable of moving according to a path uses specific detection sensors, such as ultrasonic sensors, usually known as "UPA" standing for "Ultrasonic Park Assist" to detect a target object, such as a pedestrian or an intersected vehicle, and to carry out automatic braking to avoid a collision for example.

A drawback of this prior art is that since such sensors are not directional sensors, they are not capable of checking if an obstacle is situated on the path of the vehicle. Therefore, this involves decisions concerning automatic braking which are not always adequate. For example, if the subject vehicle intersects another vehicle which is situated at the side, inopportune braking could be triggered, although the intersected vehicle is not a problem.

What is needed, therefore, is a device and method that improves upon and provides advantages over the prior art.

SUMMARY OF THE INVENTION

One object of the present invention is a method for monitoring the environment of a vehicle capable of moving according to a path, which enables the aforesaid problem to be resolved.

According to a first aim of the invention, this object is achieved by a method for monitoring the environment of a vehicle capable of moving according to a path, wherein it comprises the steps of:

calculating a plurality of critical levels of driving depending on detection sensors, parameters related to the vehicle and an obstacle being in the environment of the vehicle;

determining if an obstacle is on the path of the vehicle; and depending on the calculated critical levels and determination of an obstacle on the path of the vehicle, making a decision concerning the braking of the vehicle.

The detection sensors are preferably ultrasonic sensors. At least one critical level takes account of the angle at the steering wheel of the vehicle.

This ensures more precision and reliability when maneuvering at low speed.

As will be seen in detail below, the various critical levels and the determination of an obstacle on the path enable an adequate decision concerning the braking of the vehicle to be made because these parameters provide accurate data on the driving situation and detection of an obstacle in the environment of the vehicle.

According to non-restrictive embodiments, the method also exhibits the following features.

A first critical level of driving is determined depending on the activation of the detection sensors. This enables the critical level to be weighted according to the number of sensors which have detected an obstacle (the situation is more critical if several sensors have detected an obstacle).

A second critical level of driving is determined as a function of a speed of the vehicle. This enables the speed of the vehicle to be taken into account as a critical parameter. The critical level is more important if the speed of the vehicle is high.

A third critical level of driving is determined depending on a distance from the obstacle calculated in relation to the vehicle. This enables the distance from the obstacle in relation to the vehicle to be taken into account as critical parameter. The critical level is higher if the distance between the obstacle and the car is short.

A fourth critical level of driving is determined depending on the relative speed of the obstacle in relation to the vehicle. This enables the relative speed of the obstacle in relation to the vehicle as critical parameter to be taken into account. The critical level is higher if the obstacle is approached quickly.

The distance from the obstacle is calculated depending on an angle at the steering wheel of the vehicle. This ensures more precision and reliability when maneuvering at low speed (lateral acceleration and yaw rate are not very representative when quasi static).

Depending on the angle at the steering wheel of the vehicle, only the distances measured by some of the detection sensors are considered. Robustness as regards monitoring is therefore improved.

The sensors considered are those distributed overall around a direction corresponding to the angle at the steering wheel. For example, if the angle at the steering wheel is to the right, all the sensors considered will be on the right; if the angle at the steering wheel is to the left, all the sensors considered will be on the left; if the angle is zero all the sensors will be in the center. In the latter case, therefore all the sensors may be considered. Thus several sets of sensors can be associated with several intervals of angle at the wheel. The number of intervals is not restrictive.

The distance from the obstacle is calculated using the smallest sensor distance among the sensor distances transmitted by the detection sensors considered. This calculation is more simple.

A critical marker is determined on the basis of the calculated critical levels of driving equal to the average of the two highest critical levels of driving.

The step of determining an obstacle on the path of the vehicle comprises the sub-steps of:

determining a level of confidence associated with a detection sensor depending on a distance transmitted by the detection sensors;

defining static zones of detection and probabilities of detection associated with each static zone depending on the given levels of confidence;

defining dynamic zones of detection; and determining if an obstacle is situated on the path of the vehicle, as a function of the probabilities and the dynamic zones.

This enables the obstacles to be better detected depending on what the driver does with the steering wheel and thus on possible changes of direction.

The method moreover comprises an additional step of detecting whether the vehicle comprises a rear trailer. This enables an electrical trailer contact to be dispensed with. It must be known if there is a trailer so as not to wrongly detect an obstacle at the rear although it is a trailer, which would not be relevant.

The decision concerning braking is a minimum request to apply the brakes of the vehicle in order to accelerate triggering of the brakes if there is an obstacle on the path of the vehicle and the various critical levels of driving are higher than a given critical threshold. This enables braking reaction time to be improved.

According to a second object of the invention, it relates to a device for monitoring the environment of a vehicle capable of moving according to a path, wherein it comprises a control unit for:

calculating a plurality of critical levels of driving depending on detection sensors, parameters related to the vehicle and an obstacle being in the environment of the vehicle;

determining if an obstacle is on the path of the vehicle; and depending on the calculated critical levels and determination of an obstacle on the path of the vehicle, making a decision concerning the braking of the vehicle.

The sensors of this monitoring device, according to an embodiment, are ultrasonic detection sensors. The parameters include the angle at the steering wheel.

According to a non-restrictive embodiment, the control unit is moreover capable of:

determining a level of confidence associated with a detection sensor depending on a distance transmitted by the detection sensors;

defining static zones of detection and probabilities of detection associated with each static zone depending on the given levels of confidence;

defining dynamic zones of detection; and determining if an obstacle is situated on the path of the vehicle, as a function of the probabilities and the dynamic zones.

According to an embodiment, the inventive monitoring device implements a method, object of this invention.

According to a third object of the invention, it relates to a computer program product comprising one or more sequences of instructions executable by a data processor, the execution of the sequences of instructions enabling the method to be implemented according to any one of the above features.

These and other objects and advantages of the invention will be apparent from the following description, the accompanying drawings and the appended claims.

BRIEF DESCRIPTION OF THE ACCOMPANYING DRAWINGS

Other features and advantages of this invention will be better understood by way of the description and non-restrictive drawings, wherein.

DETAILED DESCRIPTION OF THE PREFERRED EMBODIMENTS

The term "automotive vehicle" is understood to mean any vehicle comprising an engine.

Figure 1:
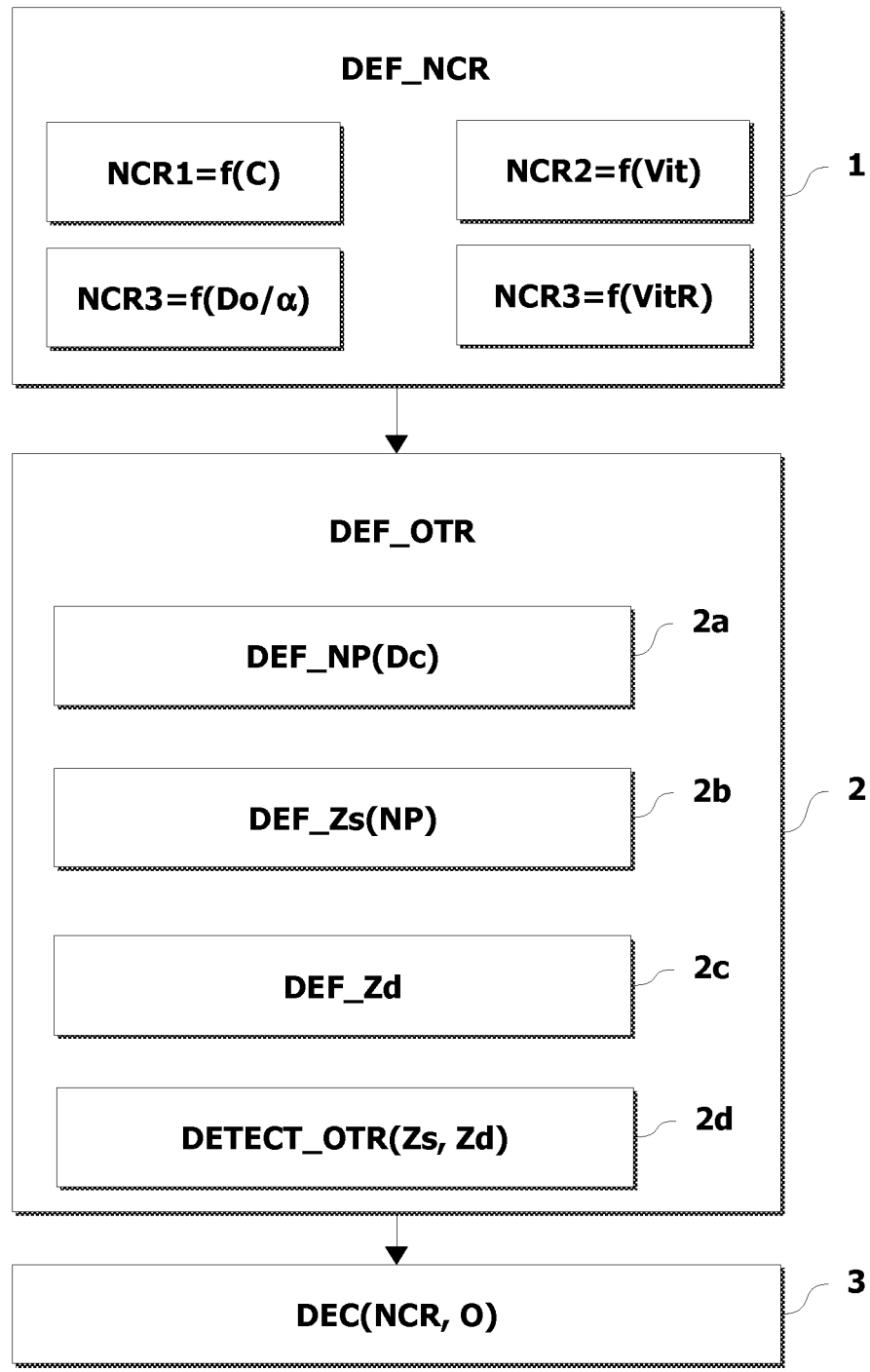
FIG. 1 illustrates a diagram of a first non-restrictive embodiment of the inventive monitoring method.

The monitoring method includes the following steps as illustrated in FIG. 1:

calculating a plurality of critical levels of driving NCR as a function of the detection sensors C, parameters related to the vehicle V and an obstacle O being in the environment of the vehicle (step DEF_NCR);

determining if an obstacle O is on the path TR of the vehicle V (step DEF_OTR); and depending on the calculated critical levels NCR and determination of an obstacle O on the path TR of the vehicle V, making a decision concerning the braking of the vehicle (step DEC (NCR, O)).

Figure 2:
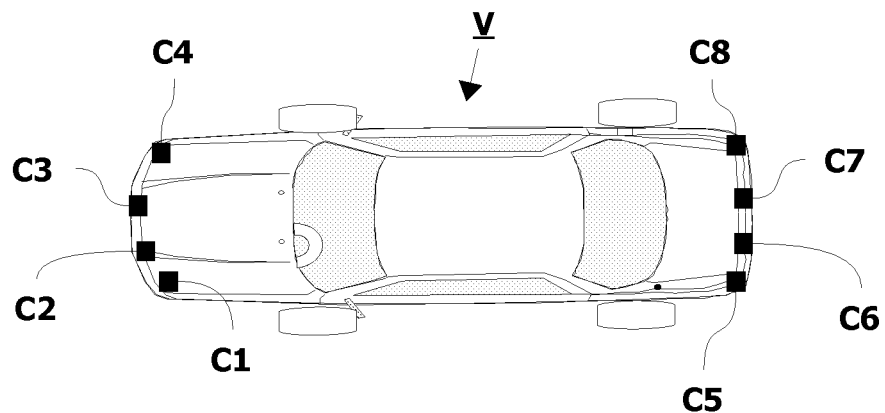
FIG. 2 illustrates a diagram of a vehicle comprising detection sensors used by the monitoring method of FIG. 1.

It will be noted that in the example used for the description, the vehicle comprises four front detection sensors (two central C2, C3 and two lateral C1, C4) and four rear detection sensors (two central C6, C7 and two lateral C5, C8) as illustrated on FIG. 2.

It will be noted that, for the continuation of the description, the example of monitoring the environment in front of the vehicle is described. But of course what is to be described below applies in the same manner to the rear environment of the vehicle.

The steps of the method are described in detail below.

In a first step 1 (FIG. 1), a plurality of critical levels of driving NCR is calculated depending on the detection sensors C, the vehicle V and an obstacle O being in the environment of the vehicle.

In a non-restrictive embodiment, a critical level of driving NCR consists of a value varying between 0 and 1.

First Critical Level NCR1

In a non-restrictive embodiment, a first critical level of driving NCR1 is determined depending on the activation of the detection sensors C. It will be noted that in a non-restrictive embodiment, a sensor C is active if it transmits a sensor distance Dc less than a maximum detection distance Dcmax for a sensor, that is to say in a non-restrictive example 2 meters for Dcmax.

The first critical level NCR1 is determined in the following way:

If the sensors C2 or C3 (those centered at the front of the vehicle) are active the number of active sensors is multiplied by a gain equal to a first VA1 value, in a non-restrictive example equal to 0.25.

If not this means the sensors C1 and C4 active. Then the number of active sensors is multiplied by a gain equal to a second value VA2, in a non-restrictive example equal to 0.125.

It will be noted that the first value VA1 is higher than the second value VA2 because detection executed by the central sensors is more critical than detection executed by the lateral sensors.

Second Critical Level NCR2

In a non-restrictive embodiment, a second critical level of driving NCR2 is determined depending on a speed Vit of the vehicle V.

Second critical level NCR2 is determined in the following way:

If the vehicle speed Vit is equal to a maximum value VitMax, in a non-restrictive example of 10 km/h, the critical level NCR2 is equal to 1.

If not the critical level NCR2 is equal to 0 at zero km/h and varies linearly between these 2 values.

Third Critical Level NCR3

In a non-restrictive embodiment, a third critical level of driving NCR3 is determined depending on a distance from the obstacle Do calculated in relation to the vehicle V.

It is reckoned that the greater the distance Do from the obstacle, the further the obstacle O is away from the vehicle and the less critical the third critical level of driving NCR3.

In a non-restrictive embodiment, the third level of driving NCR3 is equal to: NCR3=[(Do−Dcmax)/[(0.25−Dcmax)], with Dcmax=2 meters as considered previously.

In a non-restrictive embodiment, the distance Do from the obstacle is calculated depending on an angle at the steering wheel $\alpha$ of the vehicle. The sensors are thus weighted depending on the will of the driver to go to the left or to the right. This ensures better robustness as regards monitoring. Calculation is executed in the following way in a non-restrictive embodiment.

Figure 3:
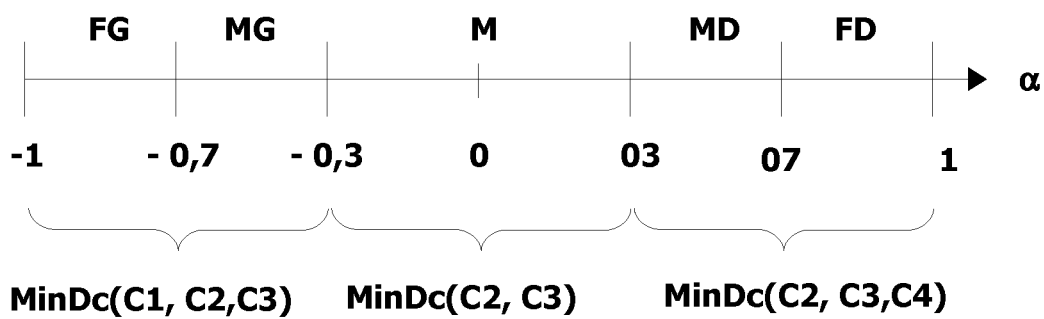
FIG. 3 illustrates a diagram explaining the calculation of a distance from an obstacle in relation to a vehicle depending on an angle at the steering wheel of the vehicle, according to a step of the monitoring method of FIG. 1.

Five different states are determined for the angle at the steering wheel which are the following as illustrated on FIG. 3:

$\alpha$=FG, which means the steering wheel is in an interval between completely to the left (that is to say on the left stop) and a slightly lesser value;

$\alpha$=MG, which means the steering wheel is situated in the center on the left;

$\alpha$=M, which means the steering wheel is situated in the center (that is to say on the right);

$\alpha$=MD, which means the steering wheel is situated in the center on the right; and $\alpha$=FD, which means the steering wheel is at an interval between completely to the right (that is to say on the right stop) and a slightly lesser value.

It will be noted that in a non-restrictive embodiment, the angle at the steering wheel $\alpha$ can be standardized by dividing it by the maximum value (in a non-restrictive example: 540°) in order to obtain values ranging between −1 and 1 for the angle at the steering wheel as illustrated on FIG. 3.

Depending on the state of the angle at the steering wheel, the minimum of the sensor distances Dc transmitted by a certain number of detection sensors is used as illustrated on FIG. 3.

Thus, when $\alpha$=FG, only the sensor distances Dc of the sensors C1, C2 and C3 are used. It is reckoned that the sensor furthest on the right C4 is not to be taken into account.

Thus the distance from the obstacle O in relation to the vehicle V is determined as being:

Do=MinDc (C1, C2, C3).

In the same way, for $\alpha$=MG, Do=MinDc (C1, C2, C3). It is reckoned that the sensor furthest on the right C4 is not to be taken into account.

In the same way, for $\alpha$=M, Do=MinDc (C2, C3). It is reckoned that the sensors furthest on the left C1 and on the right C4 are not to be taken into account.

In the same way, for $\alpha$=MD, Do=MinDc (C2, C3, C4). It is reckoned that the sensor furthest on the left C1 is not to be taken into account.

In the same way, for $\alpha$=FD, Do=MinDc (C2, C3, C4). It is reckoned that the sensor furthest on the left C1 is not to be taken into account.

Fourth Critical Level NCR4

In a non-restrictive embodiment, a fourth critical level of driving NCR4 is determined depending on the relative speed of the obstacle VitR in relation to the vehicle.

It is pointed out that the relative speed VitR is negative when the vehicle V is approaching the obstacle O. It will be noted that the relative speed is calculated on the basis of the distances determined by the ultrasonic sensors.

The fourth critical level NCR4 is equal to the relative speed VitR multiplied by a gain equal to −1.3. This value is predetermined in order to give a high critical level if the obstacle approaches the car to a significant degree.

In a non-restrictive embodiment, after these four critical levels NCR1 to NCR4 have been calculated, a critical driving marker NCR_FLG is deduced on the basis of the critical levels of driving calculated. In a non-restrictive embodiment, the critical driving marker NCR_FLG is equal to the average of the two highest critical driving levels among the four critical levels calculated. Thus a better estimate of the braking decision to be made can be obtained; it is considered that only one critical level NCR is not sufficient to say that the situation is critical (for example the car which is moving at 10 km/h gives a NCR2=1 (or more) but if there is no obstacle, the situation will not be too critical; on the other hand if addition to NCR2, there are other active sensors for example NCR1, the situation becomes more critical).

In a second phase 2, it is determined if an obstacle O is on the path TR of the vehicle V.

In a non-restrictive embodiment, the step of determining an obstacle O on the path TR of the vehicle comprises the sub-steps, as illustrated on FIG. 1, of:

determining a level of confidence NP associated with a detection sensor C depending on a distance Dc transmitted by the detection sensors (sub-step DEF_NP (DC));

defining static zones of detection Zs and probabilities of detection PZs associated with each static zone Zs depending on the given levels of confidence NP (sub-step DEF_Zs (NP));

defining dynamic zones of detection Zd (DEF_Zd sub-step); and determining if an obstacle O is situated on the path TR of the vehicle, as a function of the probabilities of detection Pzs and the dynamic zones Zd (sub-step DETECT_OTR (Zs, Zd)).

The sub-steps are described in detail below.

In a first sub-step 2a), a level of confidence NP associated with a detection sensor C is determined depending on a distance Dc transmitted by the detection sensors.

A level of confidence NP depends on a sensor distance transmitted by a sensor C. It is reckoned that the shorter the sensor distance Dc, the higher the level of confidence NP. It is therefore reckoned that a sensor C has detected a real obstacle and not some noise, echo or another vehicle which passes alongside the subject vehicle.

Thus, in non-restrictive examples, a level of confidence includes:

the following values for an active sensor C:

NP=0.95, for Dc<0.8 m.

NP=0.8, for Dc>1.5 m

Np=0.90, for Dc=1 m

Np=0.85, for Dc=1.2 m

It will be noted that the values ranging between these values are extrapolated linearly.

It is pointed out that a sensor C is active if it transmits a sensor distance Dc lower than a maximum detection distance Dcmax (2 meters in the example used) for a sensor.

the following value for a non-active sensor:

NP=0.5

In the latter case, it means for example that an obstacle is not detected although it is present.

In a second sub-step 2b), static zones of detection Zs and probabilities of detection PZs associated with each static zone Zs depending on the given levels of confidence NP are defined.

Figure 4:
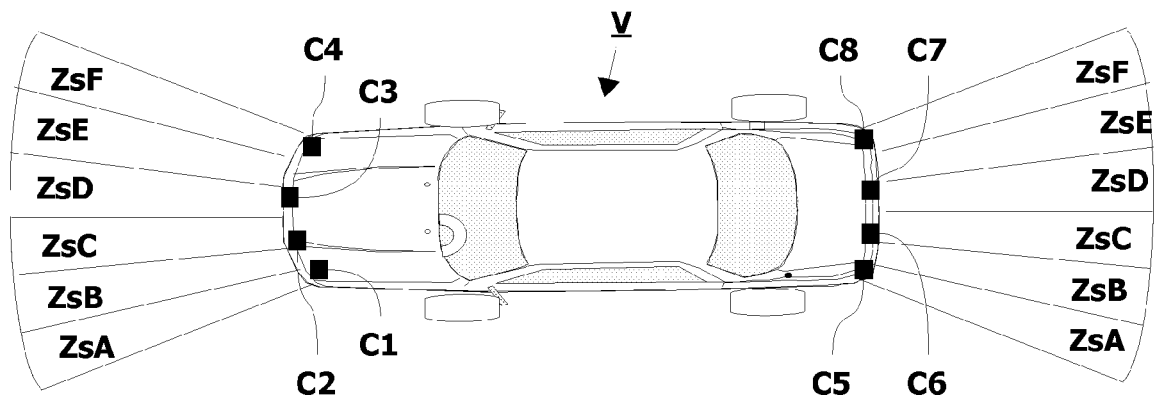
FIG. 4 illustrates a diagram of a vehicle and static zones of detection used by the monitoring method of FIG. 1.

In a non-restrictive embodiment, for the four front sensors C1 to C4, six static zones ZsA to ZsF are defined as illustrated on FIG. 4.

For each static zone, an associated probability of detection PZs is calculated using the Bayes theory of probability, known by the person skilled in the art, is calculated.

To this end, one or more detection sensors C is associated with each static zone Zs.

Thus, in a non-restrictive example:
sensor C1 is associated with zone ZsA;
sensors C1 and C2 are associated with zone ZsB;
sensors C1, C2 and C3 are associated with zone ZsC;
sensors C2, C3 and C4 are associated with zone ZsD;
sensors C3 and C4 are associated with zone ZsE; and
sensor C4 is associated with zone ZsF.

According to the Bayes formula, the levels of confidence NP associated with each sensor previously calculated are used initially.

There $PZs=\pi_i NPci/\pi NPci[\pi Npci+(\pi_i(1-NPci))]$, with i ranging from 1 to n, and n the number of sensor(s) C associated with each static zone Zs.

Thus the probability PZs associated with a static zone is equal to:

$$PZsA = NP_{c1}$$

$$PZsB = (NP_{c1} * NP_{c2})/[(NP_{c1} * NP_{c2}) + ((1-NP_{c1}) * (1-NP_{c2}))]$$

$$PZsC = (NP_{c1} * NP_{c2} * NP_{c3})/[(NP_{c1} * NP_{c2} * NP_{c3}) + ((1-NP_{c1}) * (1-NP_{c2}) * (1-NP_{c3}))]$$

$$PZsD = (NP_{c2} * NP_{c3} * NP_{c4})/[(NP_{c2} * NP_{c3} * NP_{c4}) + ((1-NP_{c2}) * (1-NP_{c3}) * (1-NP_{c4}))]$$

$$PZsE = (NP_{c3} * NP_{c4})/[(NP_{c3} * NP_{c4}) + ((1-NP_{c3}) * (1-NP_{c4}))]$$

$$PZsF = NP_{c4}$$

Thus probabilities Pzs associated with each static zone, whose values lie between 0 and 1, are obtained.

In a third sub-step 2c), dynamic zones of detection Zd are defined.

Figure 5:
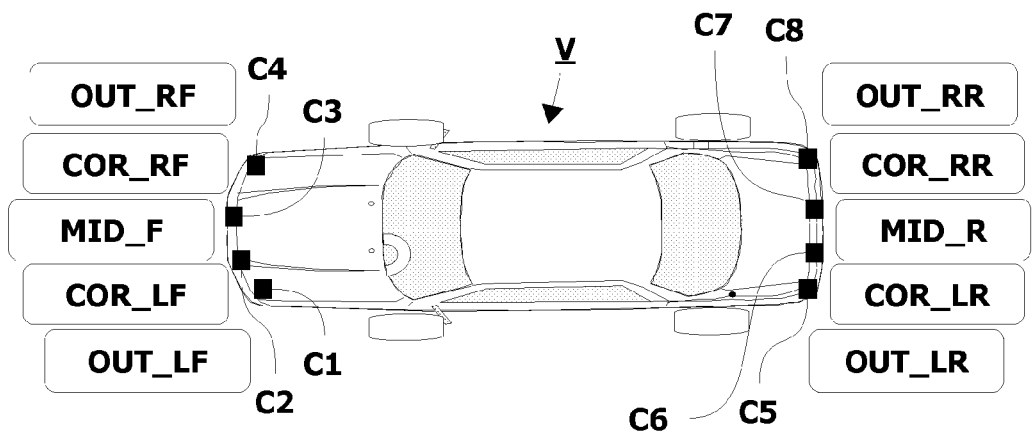
FIG. 5 illustrates a diagram of a vehicle and dynamic zones of detection used by the monitoring method of FIG. 1.

In a non-restrictive embodiment, for the four front sensors C1 to C4, five dynamic zones Zd are defined as illustrated on FIG. 5.

These dynamic zones Zd are defined depending on the movement of the vehicle V and the detection sensors C.

These dynamic zones correspond to the collision risk, depending on what the vehicle will do if it turns to the left or the right or keeps in a straight line.

These zones are called:
first zone Zd1=OUT_RF for a dynamic zone furthest on the right of the vehicle V;
second zone Zd2=COR_RF for a dynamic zone on the right of the vehicle V;
third zone Zd3=MID_F for a dynamic zone in the middle of the vehicle V;
fourth zone Zd4=COR_LF for a dynamic zone on the left of the vehicle V; and
fifth zone Zd5=OUT_LF for a dynamic zone furthest on the left of the vehicle V.

In a fourth sub-step 2d), it is determined if an obstacle O is situated on the path TR of the vehicle, as a function of the probabilities Pzs and the dynamic zones Zd.

In a non-restrictive embodiment, it is determined if an obstacle O is situated on the path TR of the vehicle, depending on the angle at the steering wheel $\alpha$.

Thus, in a non-restrictive embodiment, determination is executed in the following way.

In a first phase, it is defined in which dynamic zone Zd an obstacle O is situated as follows.

1) An obstacle O is situated in the fourth zone Zd4=COR_LF if:
$\alpha$=FG & PZsA>S1 or
$\alpha$=M or MG & PZsB>S2 or
$\alpha$=MD & PZsC>S3 or
$\alpha$=FD & PZsD>S4 or
Dc2<DS,
with S1, a first threshold of reliability (which is a value configurable on the vehicle). In a non-restrictive example, S1=0.95.
with S2, a second threshold of reliability (which is a value configurable on the vehicle). In a non-restrictive example, S2=0.95.
with S3, a third threshold of reliability (which is a value configurable on the vehicle). In a non-restrictive example, S3=0.95.
with S4, a fourth threshold of reliability (which is a value configurable on the vehicle). In a non-restrictive example, S4=0.95.
with Dc2 the sensor distance transmitted by the sensor C2.

And with DS a threshold of distance representing a situation where the obstacle O is very close to the vehicle V. In a non-restrictive example, DS=0.8 m.

2) An obstacle O is situated in the second zone Zd2=COR_RF if:
$\alpha$=FD & PZsF>S1 or
$\alpha$=M or MG & PZsE>S2 or
$\alpha$=MD & PZsD>S3 or
$\alpha$=FG & PZsC>S4 or
Dc3<DS
with Dc3 the sensor distance transmitted by the sensor C3.

It will be noted that here the same thresholds of reliability S1 to S4 are used as previously because they are symmetrical from left to right.

3) An obstacle O is situated in the third zone Zd3=MID_F if:
$\alpha$=FG & PZsA>S1' or
$\alpha$=MG & PZsB>S2' or
$\alpha$=MD&PZsE>S2'
$\alpha$=FD & PZsF>S1'
$\alpha$=M & (PZsC>S3'||PZsD>S3')
Dc2<DS and Dc3<DS,
with S1', S2', and S3' of other thresholds of reliability which have the values: S1'=0.8; S2'=0.9; S3'=0.95 in non-restrictive examples.

In a second phase, the result of the calculations executed above is considered.

If an obstacle O is situated in the fourth dynamic zone COR_LF or in the second dynamic zone COR_RF, it means there is an obstacle O in a left or right corner of the vehicle V. In this case, a corner marker COR_FLG is positioned at one. If not, the marker is positioned at zero.

If an obstacle O is situated in the third dynamic zone MID_F, it means there is an obstacle O in the middle of the path of the vehicle V. In this case, a middle marker MID_FLG is positioned at one. If not, the marker is positioned at zero.

Thus, if one of the two above markers COR_FLG or MID_FLG is positioned at one, it means there is an obstacle O on the path TR of the vehicle V. A path marker INTR_FLG1 is positioned at one.

If not, it means there is none. In this case, in a non-restrictive embodiment, it is determined if an obstacle could be situated on the path TR of the vehicle V in the following way. If PzsB, PzsC, PzsD or PzsE>S7, S7 being a threshold of reliability equal to 0.9, in a non-restrictive example, from this it is deduced that an obstacle O is probably on the path of the vehicle V. In this case, there is no obstacle on the path, but a probable obstacle, that is to say with a level of confidence lower than when the obstacle on the path is calculated (the criteria are thus less restrictive).

A probable path marker INTR_FLG2 is positioned at one.

If not, if PzsA or PzsF>S8, S8 being a threshold of reliability equal to 0.85 in a non-restrictive example, it means there is an obstacle O in front of the vehicle V but which is situated outside the path TR of the vehicle V.

If not, it means there is no obstacle O in front of the vehicle V.

In a third step 3, depending on the critical levels of driving NCR calculated and determination of an obstacle O on the path TR of the vehicle, a decision concerning the braking of the vehicle is made.

Thus, a) if there is an obstacle O on the path TR of the vehicle (path marker INTR_FLG positioned at one); and b) if the critical driving marker NCR_FLG (previously calculated during the first step) is higher than a critical threshold NCR_S (in a non-restrictive example of 0.8), from this it is deduced that the obstacle O is critical for the vehicle V. In this case, the decision concerning braking is a decision to trigger automatic braking. In a non-restrictive embodiment, the automatic reduction of the speed of the automotive vehicle V is executed by autonomous braking. Autonomous braking avoids a driver of the automotive vehicle V himself having to slow down using a brake pedal.

In non-restrictive illustrative embodiments, braking can be hydraulic, electro-hydraulic or electric.

In a non-restrictive embodiment, the decision concerning braking is a minimum braking request of the brakes of the vehicle to accelerate triggering of the brakes if there is an obstacle O on the path of the vehicle and if the various critical levels of driving are higher than a given critical threshold NCR_S.

Thus, if the two above conditions a) and b) are met when critical threshold NCR S has a value of 0.7 or when an obstacle is probably on the path TR of the vehicle V (probable path marker INTR_FLG2 at one), this minimum request RQ is initiated.

The minimum braking request RQ is sent by means of a braking command transmitted by a control unit UC.

In the case of hydraulic or electro-hydraulic braking, the braking command is transmitted to a pump ABS located in an ESC "Electronic Stability Control" modulator in order to reduce the hydraulic response time of the brakes, by filling the brake calipers with brake fluid in an anticipated way, creating hydraulic pressure in the brakes which are then "pre-charged". The pump ABS enables pressure in the brakes of the automotive vehicle V to be generated/removed, while cooperating with a hydraulic modulator unit contained in the ESC modulator, which forces the brake calipers of the disc brake together.

The operation of an ESC modulator being known by the person skilled in the art, it will not be described here.

This function of pre-filling the brakes of the automotive vehicle V with pressure is usually called "brake pre-fill". In a non-restrictive illustrative embodiment, this minimum braking request RQ enables the pressure of the brakes to be increased by one or two bars.

In the case of electric braking, the braking command is transmitted to an electrical brake motor MB to bring the brake calipers of the disc brake together.

Thus, the method described enables automatic braking to be triggered based on precise parameters (obstacle O on the path of the vehicle, angle at the steering wheel, static and dynamic zones of detection).

Figure 6:
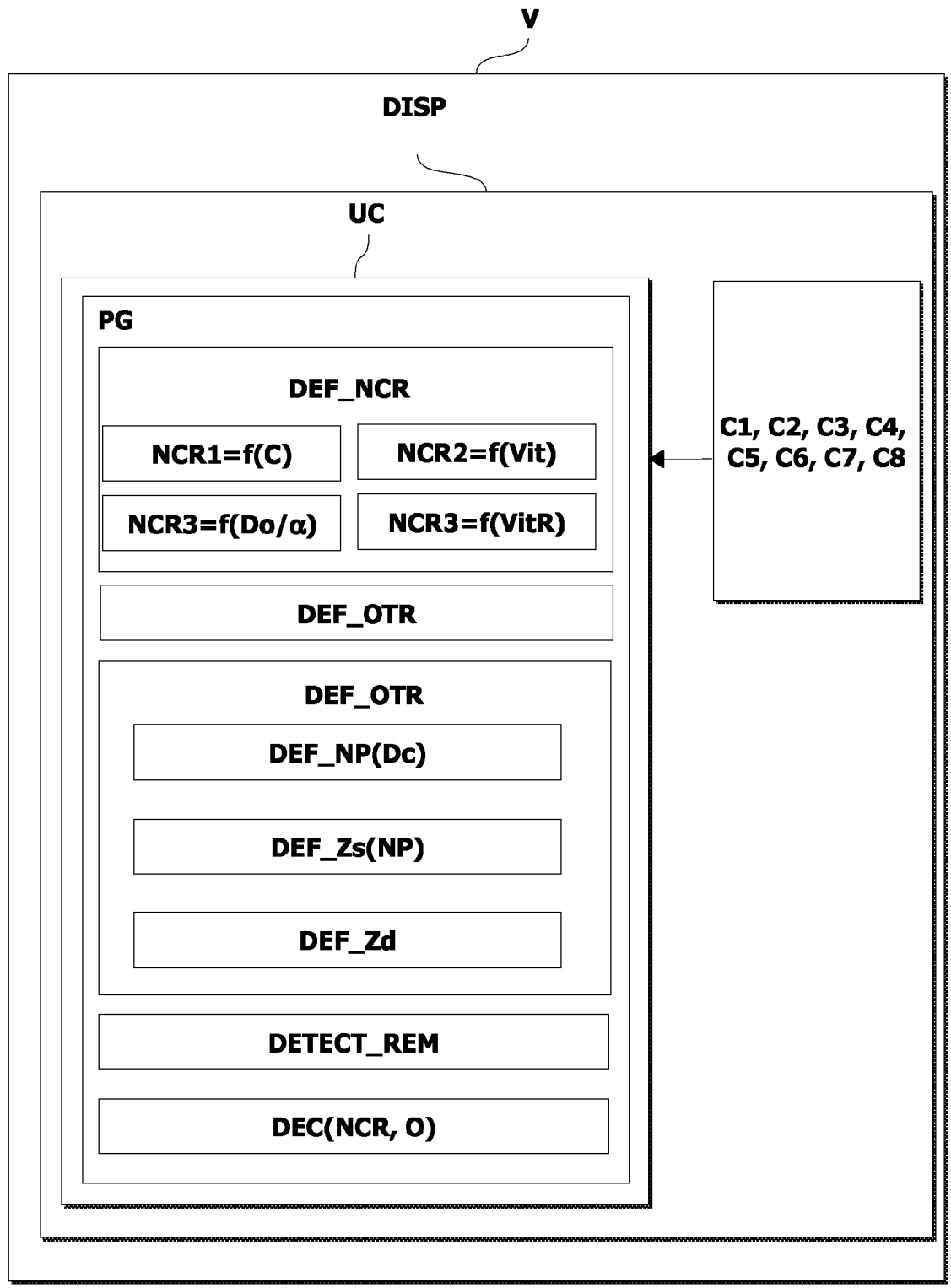
FIG. 6 illustrates a non-restrictive embodiment of a device for implementing the method of FIG. 1.

The method of the invention is implemented by a device DISP for monitoring the environment of a vehicle capable of moving according to a path, illustrated on FIG. 6.

This device DISP is integrated in the vehicle V.

This device DISP notably comprises a control unit UC for:

calculating a plurality of critical levels of driving NCR depending on the detection sensors C, parameters related to the vehicle V and an obstacle O being in the environment of the vehicle V;

determining if an obstacle O is on the path TR of the vehicle V; and depending on the critical levels of driving NCR calculated and determination of an obstacle O on the path TR of the vehicle, making a decision concerning the braking of the vehicle V.

In a non-restrictive embodiment, the control unit UC is moreover capable of:

determining a level of confidence NP associated with a detection sensor depending on a distance Dc transmitted by the detection sensors C;

defining static zones of detection Zs and probabilities of detection PZs associated with each static zone depending on the given levels of confidence NP;

defining dynamic zones of detection Zd; and determining if an obstacle O is situated on the path TR of the vehicle V, as a function of the probabilities PZs and the dynamic zones Zd.

In a non-restrictive embodiment, the detection device DISP moreover can comprise the detection sensors C1 to C8.

In this application, the detection sensors C are ultrasonic sensors. The advantage of such sensors is their broad cone of detection, their low cost and their omnipresence in the automobile industry. It will be noted that these sensors generally have a range of approximately 2 meters in contrast to detection sensors such as lidars or radars which have a longer range.

It will be noted that implementation of the monitoring method disclosed above can be executed by means of a "software" programmed microprocessor, cabled logic and/or "hardware" electronic components.

Thus, the monitoring device DISP can include a computer program product PG comprising one or more sequences of instructions executable by a data processing device such as a microprocessor or processing unit of a microcontroller, an ASIC, a computer etc, the execution of the sequences of instructions enabling the method described to be implemented.

Such a computer program PG can be installed in writable non-volatile memory of the ROM type or in rewritable non-volatile memory of the EEPROM or FLASH type. The computer program PG can be written to memory in the works or loaded to memory or remotely downloaded to memory. The sequences of instructions can be sequences of machine instructions or sequences of a control language interpreted by the processing unit at the time of their execution.

In the non-restrictive example of FIG. 6, the computer program PG is written to a memory in the control unit UC of the device DISP.

Of course the description of the method is not limited to the embodiments and examples described above.

Figure 7:
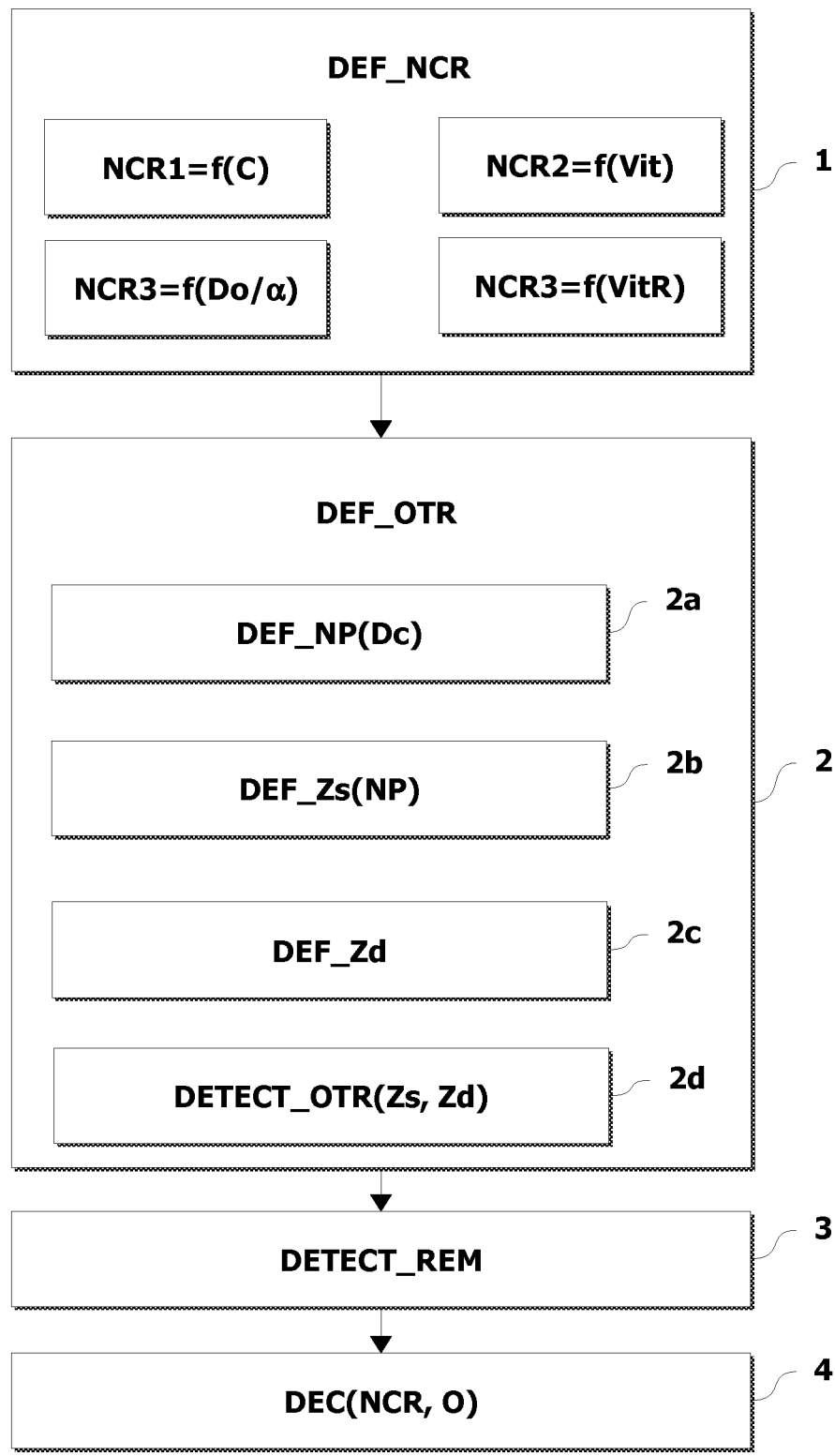
FIG. 7 illustrates a diagram of a second non-restrictive embodiment of the inventive monitoring method. The method for monitoring the environment of a vehicle capable of moving according to a path, according to the invention, is described in a non-restrictive embodiment on FIG. 1.

Thus, in a non-restrictive embodiment, the monitoring method can also comprise an additional step to detect whether the vehicle comprises a rear trailer REM (step DETECT_REM as illustrated on FIG. 7).

It will be noted that in this case the rear environment of the vehicle V is monitored.

This additional step is executed before the decision concerning braking is made (as illustrated on FIG. 7).

This additional step is triggered according to two conditions:
  on the one hand if the vehicle V is moving;
  in addition if the central rear sensors C6 and C7 are active.

If the two conditions are met, detection of a rear trailer REM is executed as follows.

For each central rear sensor C6 and C7 the difference DIFF is calculated between the speed of the vehicle and the relative speed VitR of the obstacle O, here a rear obstacle O, in relation to the vehicle, the latter being calculated on the basis of the sensor distance Dc provided by the sensor through deriving the distance. If this difference DIFF is equal to zero, it means the obstacle O is stationary in relation to the ground. If the absolute value of the relative speed VitR is zero and the obstacle O is not stationary, it is deduced therefrom that the obstacle O is a trailer REM. Then a trailer marker FLG_REM is positioned at one.

It will be noted that if the difference DIFF calculated is equal to zero and the relative speed VitR is close to zero, it means the vehicle and obstacle O are both stationary.

Thus, if a trailer REM is detected (FLG_REM=1) automatic braking cannot be carried out in reverse. The decision made DEC (NCR, O) is that no automatic braking is executed.

it is simple to implement and can be applied to all braking systems including electric;

it enables ultrasonic sensors, currently used for braking while parking and for speeds greater than in the cases of parking, to be utilized;

it enables braking reaction time to be accelerated thanks to the transmission of the minimum braking request; and it enables autonomous braking with ultrasonic sensors to be carried out.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A detection method for monitoring an environment of a vehicle capable of moving according to a path, wherein said method comprises the steps of:
  calculating, via a data processor, a plurality of critical levels of driving depending on a plurality of sensed signals from a plurality of ultrasonic detection sensors and at least one of a speed of said vehicle, a detected distance to an obstacle taking account of an angle of a steering wheel said vehicle, and a relative velocity between said vehicle and said obstacle;
  determining if said obstacle is on the path of said vehicle; and
  determining a level of confidence associated with each of said plurality of ultrasonic detection sensors depending on a distance between said vehicle and said obstacle;
  said step of determining if said obstacle is on the path of said vehicle further comprising the steps of:
    defining static zones of detection and probabilities of detection associated with each of said static zones of detection in response to the at least one level of confidence;
    defining dynamic zones of detection;
    determining, for each of said dynamic zones of detection, if said obstacle is on the path of said vehicle as a function of said probabilities of detection and taking into account said angle of said steering wheel; and
  deducing a critical marker on a basis of at least two of the critical levels of driving and sending a braking signal for braking said vehicle in response to the determination that said obstacle is on the path of said vehicle and said critical marker is higher than a critical threshold; and
  wherein said dynamic zones of detection correspond to a collision risk if said vehicle turns right, turns left or keeping straight.

2. The detection method according to claim 1, wherein a first critical level of driving is determined depending on an activation of said ultrasonic detection sensors.

3. The detection method according to claim 2, wherein a second critical level of driving is determined depending on a speed of said vehicle.

4. The detection method according to claim 2, wherein a third critical level of driving is determined depending on a distance from said obstacle calculated in relation to said vehicle.

5. The detection method according to claim 2, wherein said first critical level of driving is weighted according to a number of said plurality of ultrasonic detection sensors that have detected said obstacle.

6. The detection method according to claim 1, wherein a second critical level of driving is determined depending on a speed of said vehicle.

7. The detection method according to claim 6, wherein a third critical level of driving is determined depending on a distance from said obstacle calculated in relation to said vehicle.

8. The detection method according to claim 1, wherein a third critical level of driving is determined depending on a distance from said obstacle calculated in relation to said vehicle.

9. The detection method according to claim 8, wherein said distance of said obstacle is calculated depending on an angle at the steering wheel of said vehicle.

10. The detection method according to claim 9, wherein, depending on said angle at said steering wheel of said vehicle, only the sensor distances measured by some of said ultrasonic detection sensors are considered.

11. The detection method according to claim 10, wherein said distance from said obstacle is calculated using the shortest sensor distance among the sensor distances transmitted by said ultrasonic detection sensors considered.

12. The detection method according to claim 1, wherein a fourth critical level of driving is determined depending on the relative speed of said obstacle in relation to said vehicle.

13. The detection method according to claim 1, wherein said detection method also comprises an additional step of detecting whether said vehicle comprises a rear trailer.

14. The detection method according to claim 1, wherein the decision concerning braking is a minimum braking request of the brakes of said vehicle to accelerate triggering of said brakes if said obstacle is on said path of said vehicle and if said critical marker is higher than a given critical threshold.

15. The detection method as recited in claim 1, wherein said method comprises the step of:

storing a computer program product comprising one or more sequences of computer instructions executable by a data processor in memory, said data processor executing said sequences of instructions.

16. The detection method as recited in claim 1, wherein said plurality of ultrasonic detection sensors are distributed around the vehicle in a direction corresponding to said angle of said steering wheel.

17. The detection method as recited in claim 1, wherein said plurality of ultrasonic detection sensors whose signals are considered being those that are associated with said angle of said steering wheel.

18. A detection method for monitoring an environment of a vehicle capable of moving according to a path, wherein said method comprises the steps of;
    calculating, via a data processor, a plurality of critical levels of driving depending on a plurality of sensed signals from a plurality of ultrasonic detection sensors and at least one of a speed of said vehicle, a detected distance to an obstacle taking account of an angle of a steering wheel said vehicle, and a relative velocity between said vehicle and said obstacle;
    determining if said obstacle is on the path of said vehicle; and
    determining a level of confidence associated with each of said plurality of ultrasonic detection sensors depending on a distance between said vehicle and said obstacle;
    said steps of determining if said obstacle is on the path of said vehicle further comprising the steps of;
        defining static zones of detection and probabilities of detection associated with each of said static zones of detection in response to the least one level of confidence;
        defining dynamic zones of detection;
        determining, for each of said dynamic zones of detection, if said obstacle is on the path of said vehicle as a function of said probabilities of detection and taking into account said angle of said steering wheel; and
        deducting a critical marker on a basis of at least two of the critical levels of driving and sending a braking signal for breaking said vehicle in response to the determination that said obstacle is on the path of said vehicle and said critical marker is higher than a critical threshold; and
    wherein said dynamic zones of detection correspond to a collision risk if said vehicle turns right, turns left or keeping straight;
    wherein said critical marker is determined on the basis of said calculated critical levels of driving equal to the average of the two highest critical levels of driving.

19. A monitoring device for monitoring an environment of a vehicle capable of moving according to a path, wherein said monitoring device comprises a control unit configured to:
    calculate, via a data processor, a plurality of critical levels of driving depending on a plurality of sensed signals from a plurality of ultrasonic detection sensors, and at least one of a speed of said vehicle, a detected distance to an obstacle taking account of an angle of a steering wheel said vehicle, and a relative velocity between said vehicle and said obstacle;
    determine if said obstacle is on the path of said vehicle; and
    determine a level of confidence associated with each of said plurality of ultrasonic detection sensors depending on a distance between said vehicle and said obstacle;
    define static zones of detection and probabilities of detection associated with each of said static zones of detection in response to the at least one level of confidence;
    define dynamic zones of detection;
    determine, for each of said dynamic zones of detection, if said obstacle is on the path of said vehicle as a function of said probabilities of detection and taking into account, an angle of said steering wheel; and
    deduce a critical marker on the basis of at least two of said plurality of critical levels of driving and send a braking signal for braking said vehicle in response to a determination that said obstacle is on the path of said vehicle and the critical marker is higher than a critical threshold;
    wherein said dynamic zones of detection correspond to a collision risk if said vehicle turns right, turns left or keeps straight.

20. A detection method for monitoring an environment of a vehicle capable of moving according to a path, wherein said method comprises the steps of;
    calculating, via a data processor, a plurality of critical levels of driving depending on a plurality of sensed signals from a plurality of ultrasonic detection sensors and at least one of a speed of said vehicle, a detected distance to an obstacle taking account of an angle of a steering wheel said vehicle, and a relative velocity between said vehicle and said obstacle;
    determining if said obstacle is on the path of said vehicle; and
    determining a level of confidence associated with each of said plurality of ultrasonic detection sensors depending on a distance between said vehicle and said obstacle;
    said step of determining if said obstacle is on the path of said vehicle further comprising the steps of:
        defining static zones of detection and probabilities of detection associated with each of said static zones of detection in response to the at least one level of confidence;
        defining dynamic zones of detection;
        determining, for each of said dynamic zones of detection, if said obstacle is on the path of said vehicle as a function of said probabilities of detection and taking into account said angle of said steering wheel; and
    deducting a critical marker on a basis of at least two of the critical levels of driving and sending a braking signal for braking said vehicle in response to the determination that said obstacle is on the path of said vehicle and said critical marker is higher than a critical threshold; and
    wherein said dynamic zones of detection correspond to a collision risk if said vehicle turns right, turns left or keeping straight;
    wherein a first critical level of driving is determined depending on an activation of said ultrasonic detection sensors;
    wherein said critical marker is determined on the basis of said calculated critical levels of driving equal to the average of the two highest critical levels of driving.

* * * * *

UNITED STATES PATENT AND TRADEMARK OFFICE
CERTIFICATE OF CORRECTION

PATENT NO. : 8,452,506 B2
APPLICATION NO. : 12/693587
DATED : May 28, 2013
INVENTOR(S) : Xavier Groult It is certified that error appears in the above-identified patent and that said Letters Patent is hereby corrected as shown below:

On the Title Page, Item (54) and in the specification, Column 1, Line 2, in the Title, please delete "AUTOMATIC" and insert -- AUTOMOTIVE -- therefore.

In the Specifications:

In Column 6, Line 57, the formula should appear as follows: $NP = 0.90$, for $Dc = 1$ m.

In Column 6, Line 58, the formula should appear as follows: $NP = 0.85$, for $Dc = 1.2$ m.

In Column 7, Line 23, the formula should appear as follows:
$PZs = \pi iNPci / [\pi iNPci + (\pi i(1-NPci))]$.

In the Claims:

In Column 13, Line 33, Claim 18, after the, please insert -- at --.

In Column 13, Line 40, Claim 18, please delete "deducting" and insert -- deducing -- therefore.

In Column 13, Line 42, Claim 18, please delete "breaking" and insert -- braking -- therefore.

In Column 14, Line 46, Claim 20, please delete "deducting" and insert -- deducing -- therefore.

Signed and Sealed this
Sixth Day of August, 2013

Teresa Stanek Rea
*Acting Director of the United States Patent and Trademark Office*